Patented May 22, 1923

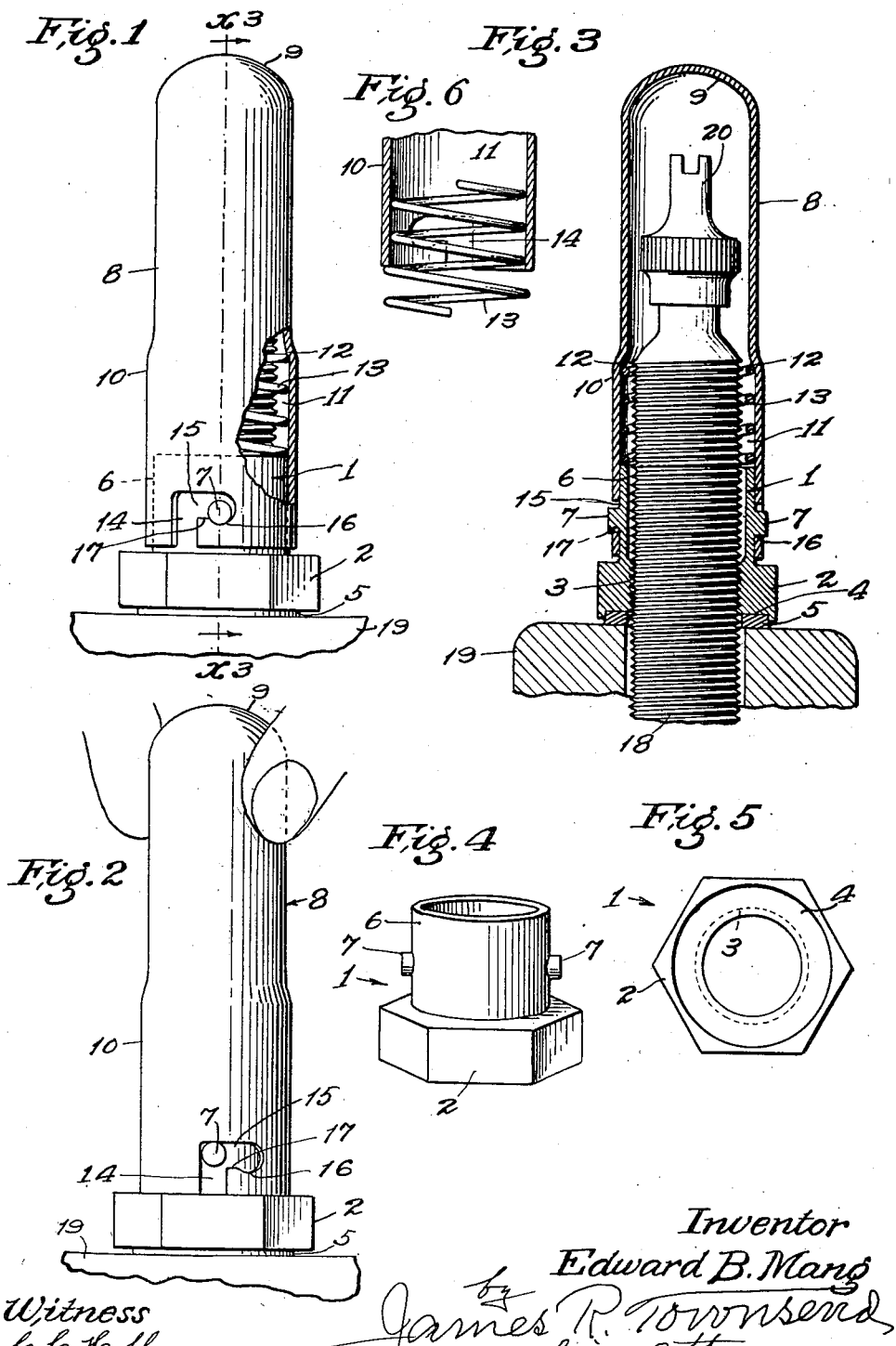

1,456,245

UNITED STATES PATENT OFFICE.

EDWARD B. MANG, OF LOS ANGELES, CALIFORNIA.

DUST CAP.

Application filed March 14, 1919. Serial No. 282,744.

*To all whom it may concern:*

Be it known that I, EDWARD B. MANG, a citizen of the United States, residing at Los Angeles, in the county of Los Angeles and State of California, have invented a new and useful Dust Cap, of which the following is a specification.

This invention relates to devices for protecting the outer end of valve stems to exclude dust therefrom, and is especially intended for use on the valve stems of pneumatic tires, but may be employed in other situations.

An object of this invention is to provide a cheap, simple, easily manufactured device which may be easily applied to the threaded open ends of projecting tubes such as valve stems.

Devices for this purpose have heretofore been provided, but such devices so far as I am aware have been subject to certain difficulties of manufacture, or to certain objections in practical use; so that they have not come into extensive use in the art, although such a contrivance has long been sought and is desired by automobile owners.

It is desirable upon the part of the automobile owner that the dust cap for the valve stems of the pneumatic tires can be applied and removed quickly, and with the certainty that they are securely fixed in place, and will exclude the dust and the weather.

It is also desirable that the parts be so arranged that by visual inspection the fact that they are properly adjusted can be determined.

An object of this invention is to provide the automobile owner with a contrivance that meets these demands.

An object of this invention is to so facilitate the removal and application of the cap that the operator will not be loath to pump up the tire at such frequent intervals as may be required to keep the tire in the proper working condition.

I have avoided all of the difficulties above set forth, and have attained all of the advantages and objects stated, by simply providing for the open threaded end of the valve stem, a nipple threaded to screw onto the valve stem and provided with one or more lugs; and by fitting onto said nipple a cap, having an enlargement at its lower end; thus forming a cavity and a shoulder to receive a helical spring, and providing the lower open end of said cap with one or more angular slots opening at the open end of the cap and terminating at the other end in a notch, directed toward said open end, so that the lugs of the nipple may be received by said slots when the cap is forced down far enough to cause the end of the nipple to sufficiently compress the spring; whereupon by turning the cap on the nipple, the lug or lugs may be brought opposite to the terminal notch or notches in the slot, and the cap being released the lugs are firmly held in said notches by the operation of the spring. The cap is removed by a reverse operation.

Objects, advantages and features of invention in addition to those above stated may appear from the accompanying drawing, the subjoined detailed description, and the appended claims.

This invention may be understood by reference to the accompanying drawing, which illustrates the same in the form I at present deem most desirable.

Figure 1 is a side elevation of my improved dust cap attached to a tube and closed. Portions of the cap are broken to expose interior construction.

Fig. 2 is a view analogous to Fig. 1, showing the relations of the cap and nipple at one period of the removing or replacing operation.

Fig. 3 is a section on line $x^3$ Fig. 1 looking in the direction of the arrows.

Fig. 4 is a perspective view of the nipple detached.

Fig. 5 is a bottom view of the nipple.

Fig. 6 is a fragmental axial sectional view showing the spring partly inserted in its chamber and somewhat exaggerated to make clear that it is of larger diameter than the chamber before being inserted thereinto.

The nipple 1 is shown as formed with a wrench boss 2 having an internal thread 3, and annular seat 4 to receive a washer 5. Said nipple is provided with spigot 6 having one or more lateral lugs 7. The nipple just described may be molded or cast of any suitable material.

Preferably the cap 8 is spun metal of practically the same thickness throughout, having a closed end 9 and an enlargement 10 at its open end, forming the spring and spigot chamber 11. The inner end of the enlargement forms a shoulder 12 against which the spring 13 fits. Said spring, when free, is normally of slightly larger diameter than the spring chamber so as to be held sufficiently friction tight in said chamber to prevent accidental dislodgment from said chamber, yet leaving the spring free to act upon the spigot to move the cap to seat the lugs in notches, provided therefor.

The retaining slots at the open end of the cap comprise a longitudinal limb 14, and a transverse limb 15 in angular relation thereto, and the notch 16 thus providing a tooth 17 between the closed terminal of the slot and the longitudinal limb thereof.

In practical use the tube 18 is supplied with the attachment by screwing the nipple onto the open end of the tube, then the cap may be applied and removed in a manner obvious from the foregoing description, all that is necessary being to take the cap in the fingers, apply it to the nipple, press it inward with the lugs in the longitudinal slots, then turn the cap until the lugs engage the closed ends of the slots, then release the cap and allow the spring to automatically press the notches into engagement with the lugs. The operator, however, is not dependent upon the sense of perception or his touch to be assured of the effect or progress of either operation for the slot and lug are freely open to visual inspection, and he can always tell by a glance at the joint, whether the cap is secured or not.

It is evident that when the cap is fixed in place the open end of the cap is withdrawn from the projecting wrench boss, a space equal to the depth of the notch lengthwise of the tube, thus allowing the cap to be removed by compressing the spring.

The spigot 6 fits the internal chamber of the cap with a working fit, the friction of which is well overcome by the strength of the spring.

In practice the washer 5 is passed over the tube 18 and seated upon the wheel rim 19 before the nipple is screwed in place and then the nipple is tightened upon the washer 5, thus holding the tube rigid to the wheel rim, it being understood that the valve stem 18 is of any usual form, attached to the pneumatic tube not shown, in any usual manner.

In the drawing the open end of the tube 18 is shown covered by the usual valve cap 20.

I claim.

1. In combination with a nipple threaded for attachment to a pneumatic tube and provided with a spigot having a lug projecting outwardly therefrom; a cap provided with a slot to receive the lug; said slot having a longitudinal limb and a transverse limb said transverse limb being provided with a notch to seat the lug; said cap being enlarged at its open end to form a chamber and a shoulder to receive and seat a spring; and a spring in said chamber engaging said shoulder and adapted to act upon the end of the spigot to force the cap away from the base of the nipple to seat the lug in said notch, said spring being held sufficiently tight in the chamber to prevent accidental dislodgment therefrom.

2. In combination with a nipple having lateral lugs, a cap provided with angular slots for said lugs; said slots being provided with notches to receive the lugs; said cap being provided with a spring chamber, and a coil spring in the cap to engage the nipple to move the cap to seat the lugs in said notches, said spring being held sufficiently tight in the chamber to prevent accidental dislodgment therefrom.

3. In combination with a nipple having lateral lugs, a cap provided with angular slots for said lugs; said slots being provided with notches to receive the lugs; said cap being provided with a spring chamber, and a coil spring in the cap to engage the nipple to move the cap to seat the lugs in said notches; the said spring being of slightly larger diameter when free than the cap, to prevent accidental dislodgment of the spring when the cap is removed.

4. The combination with an internally threaded nipple provided with a spigot and a laterally extending lug; of a cap provided with an angular slot to receive the lug, and with a notch at the inner end of the slot to seat the lug, and a spring in the cap to act upon the spigot to move the cap to seat the lug in the notch, said spring being held sufficiently tight in the cap to prevent accidental dislodgment therefrom when the cap is removed.

5. In combination with a threaded nipple, provided with a spigot having a lug projecting outwardly therefrom, a cap provided with an angular slot to receive said lug, said slot having a notch to seat said lug therein, a spring in said cap being of slightly larger diameter when free than the cap to prevent accidental dislodgment of the spring when the cap is removed and being adapted to act upon the spigot to move the cap for the purpose set forth.

In testimony whereof, I have hereunto set my hand at Los Angeles, California, this 7th day of March, 1919.

EDWARD B. MANG.

Witness:
JAMES R. TOWNSEND.